Dec. 22, 1964   K. EICHHOLTZ   3,162,397
V/STOL AIRCRAFT WITH DIRECTIONAL CONTROL NOZZLE
Filed July 26, 1962
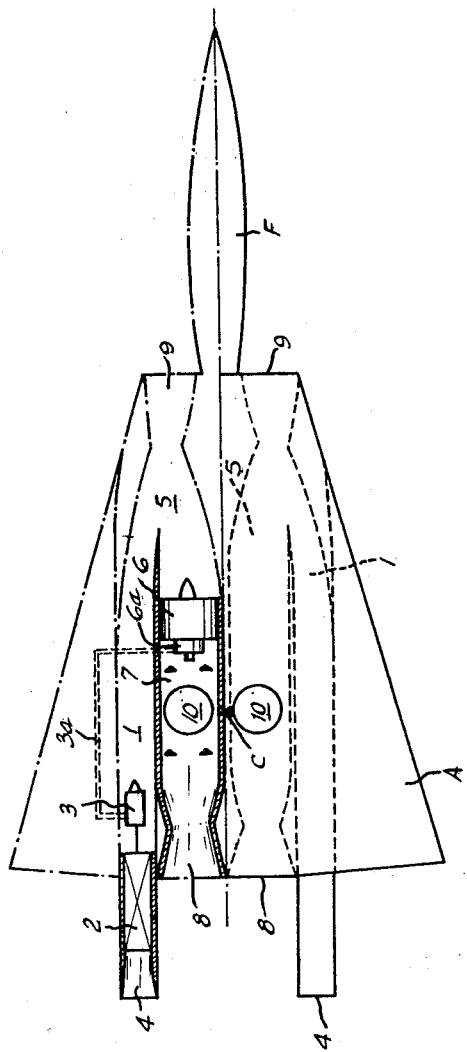
INVENTOR
KONRAD EICHHOLTZ
By: Watson, Cole, Grindle & Watson
ATTORNEYS United States Patent Office 3,162,397
Patented Dec. 22, 1964

3,162,397
V/STOL AIRCRAFT WITH DIRECTIONAL
CONTROL NOZZLE
Konrad Eichholtz, Dammarie-les-Lys, Seine et Marne, France, assignor to Societe Nationale d'Etude et de Construction de Moteurs d'Aviation, Paris, France, a company of France
Filed July 26, 1962, Ser. No. 212,593
Claims priority, application France, Aug. 4, 1961, 870,097
3 Claims. (Cl. 244—12)

It is known that at low flying speeds and particularly during short-run or vertical take-off and landing phases of aircraft designed for such manoeuvres, the conventional aerodynamic control surfaces are inoperative; recourse must then be had to other means for steering and stabilising the aircraft: generally auxiliary nozzles selectively controlled or deflecting means for the lifting jet of the aircraft, in order to produce by reaction the necessary direction control torques.

However, this kind of procedure has certain disadvantages.

If auxiliary nozzles are used which are fed with fluid under pressure tapped from the engine of the aircraft, the tapping of such fluid may cause on the one hand a sudden variation in the parameters of the thermodynamic cycle of the motive flow and on the other hand a considerable reduction in the mass flow which remains available for propulsion or lift, resulting in a loss in the performance of the engine and in disturbing the equilibrium of the aircraft.

These disturbances are all the more accentuated when deflection of the lifting jet is used, since in this case the reduction of the vertical component of the thrust and the losses due to the deflection of the jet have a direct repercussion immediately on the balance of the aircraft which must, as a result, be re-established after each direction control action, which complicates a manoeuvre which is in itself already delicate.

The present invention makes it possible to obviate these difficulties and to ensure the steering and stabilisation of the aircraft substantially without loss of performance and without disturbing the balance of the aircraft.

This result is achieved by using a control system comprising specialized directional nozzles which are distinct from the propulsion and lifting nozzles of the aircraft and are supplied permanently by an individual gas generator, these specialized nozzles being equipped with means for orienting their jet in a suitable direction in order to produce the desired direction control torques. These directional nozzles can therefore remain in operation during all phases of flight and can co-operate with the conventional aerodynamic direction control means, the action of which they complement, or may even be used as a substitute to such means in the case of flying at low speeds, particularly at take-off and at the time of landing.

The present invention appears to be applicable with particular advantage within the framework of the arrangements which were the subject of my patent application Ser. No. 152,897 filed on Nov. 16, 1961. This text describes a jet engine which comprises essentially two ducts which are wholly or partly separate from one another and terminate each in a nozzle which is preferably convergent-divergent in form and is adjustable, one of the ducts containing a gas generator and the other a low-pressure compressor driven at least partly by the useful power emanating from the said gas generator, for example in the form of compressed air.

According to the present invention, the directional nozzle of the control system of the aircraft is arranged at the end of the duct containing the gas generator, whereas the propulsion and lifting nozzles are arranged on the duct containing the low-pressure compressor.

The following description with reference to the accompanying drawing, given by way of non-limitative example with reference to a fighter aircraft, will make it easy to understand how the invention can be carried into effect.

The single figure is a diagrammatic plan view from below, partly broken away, of an aircraft to which the present invention has been applied.

This aircraft is equipped with two composite double-duct engines: on the one hand, a duct 1 containing a gas generator 2, for example a gas turbine unit driving an air compressor 3, and terminating at a discharge nozzle 4; on the other hand, a duct 5 containing a fan or low-pressure compressor 6 driven by a turbine 6a which is fed with compressed air delivered by the compressor 3 through an interconnecting pipe 3a and which is followed by a combustion chamber 7, this duct terminating in a discharge nozzle 8. The two ducts 1 and 5 have a common air inlet 9 in the example shown in the drawing. They are both required to operate in the subsonic and supersonic ranges and their discharge nozzles 4 and 8 and also their common inlet 9 are preferably convergent-divergent and adjustable.

A litfing nozzle 10 directed downwardly is arranged on the duct 5 of each composite engine, downstream of the chamber 7 and in the immediate vicinity of the center of gravity of the aircraft, which is indicated at C.

It should be noted that the ducts 5 of the two engines are very close to the longitudinal axis of the aircraft, on the contrary, their ducts 1 are relatively distant therefrom. Furthermore, for fighter aircraft, such as is the case here, the gas generators 2 are situated very far to the rear and it follows that the end portions of the ducts 1 with their nozzles 4 project to a considerable extent relatively to the trailing edge of the wing A of the aircraft; this backward arrangement of the gas generators creates a nosing-up torque which counterbalances the diving torque due to the loads situated forwardly of the center of gravity C and more particularly in the forward part of the fuselage F (radar and other equipment carried on board, armament, cockpit, etc.).

However, it will be apparent that it would not constitute a departure from the scope of the invention to adopt a different relative arrangement of the nozzles 4 and 8, which however does not affect the position of the center of gravity. More particularly, owing to acoustic phenomena, it may be advantageous to arrange the discharge nozzles 4 and 8 so that they debouch substantially in the same transverse plane. For this purpose, the power duct 5 will be slightly extended towards the rear whereas on the contrary the gas generator 2 will be moved forwards, so that the center of gravity C remains unchanged.

According to the present invention, the discharge nozzle 4 of each engine is a directional nozzle of any desired suitable type adapted to produce deflection of the jet from its normal direction parallel to the longitudinal axis of the aircraft. Many devices of this kind are known: For example swivellable nozzles, nozzles having retractable obstacles, or comprising small transverse blowing nozzles, discharge nozzles having grids of vanes and other similar deflectors.

The provision of different and distinct discharge nozzles specialized for lifting, propulsion and direction control, offers the possibility of arranging the directional nozzles 4 in the best possible way for the production of the necessary direction control torques. Thus it is possible to place these discharge nozzles 4 in a position which is considerably offset relatively to the three axes of the aircraft which pass through its center of gravity C, which permits exerting considerable directional control torques whilst using jets of low power, owing to the great length of the lever arms used. The thrust losses due to the deflection of such direction control jets of low power are, therefore, very small.

Furthermore, since these jets are normally parallel to the longitudinal axis of the aircraft, the thrust losses affect only the propulsive force acting along this axis, which does not in any way disturb the balance of the aircraft during critical periods of flying at low speeds, since the lifting nozzles 10 are in on way affected by the deflection of the jet produced by the direction control nozzles 4.

It should be remarked that when these latter are supplied by the gas generators 2 of composite engines of the aircraft, the direction control moments in subsonic flight in the vicinity of the ground increase in a substantially linear fashion from their initial value at zero speed as a function of the dynamic pressure, as in the case of conventional aerodynamic control means. At greater altitudes, the increase in the direction control moments in supersonic flight as a function of the dynamic pressure is greater than in the linear law, whereas on the contrary the increase in the direction control moments of an aerodynamic surface in the same flying conditions is smaller.

Furthermore, as the power control of the composite engines described can be effected through a considerable range with a continuous running of the gas generators, the exhaust flow of the latter remains available for direction control under very variable conditions of flying.

It will be apparent that modifications can be made to the form of embodiments which has just been described, more particularly by the substitution of equivalent technical means, without, however, departing from the scope of the present invention.

More particularly, it is possible to envisage the use of a single gas generator duct such as 1 which would occupy in this case a position centered on the longitudinal axis of the aircraft. The single directional nozzle 4 would then of course only provide the moments about the pitch and the yaw axes but not the moments about the roll axis which are to be produced in another way.

What is claimed is:

1. A VTOL or STOL aircraft comprising at least one downwardly directed lifting nozzle which is designed to produce upward thrust for exerting a lifting action on the aircraft, at least one rearwardly directed propulsion nozzle which is distinct from said lifting nozzle and which is designed to produce forward thrust for exerting a propelling action on the aircraft, at least one directional nozzle which is distinct from said lifting nozzle and from said propulsion nozzle and which is designed to produce orientable thrust for exerting control moments on the aircraft, said directional nozzle being controllable to a neutral position in which it produces a rearward jet substantially parallel to the longitudinal axis of the aircraft, means for supplying motive gas to said lifting nozzle and to said propulsion nozzle, and further means, distinct from said means, for permanently supplying motive gas to said directional nozzle.

2. An aircraft as claimed in claim 1, wherein one of the motive gas supply means comprises a turbine-driven fan and the other of the motive gas supply means comprises an air compressor connected with the turbine driving said fan to supply compressed air thereto.

3. An aircraft as claimed in claim 2, wherein the turbine-driven fan belongs to the former motive gas supply means which is associated with the lifting nozzle and propulsion nozzle, and the air compressor belongs to the latter motive gas supply means which is associated with the directional nozzle.

References Cited by the Examiner

UNITED STATES PATENTS

| 2,912,188 | 11/59 | Singlemann | 244—12 |
| 2,982,495 | 5/61 | Griffith | 244—55 X |
| 3,038,683 | 6/62 | Rowe | 244—12 |
| 3,056,258 | 10/62 | Marchant | 244—12 X |

FOREIGN PATENTS

| 1,232,710 | 4/60 | France. |
| 805,418 | 12/58 | Great Britain. |

MILTON BUCHLER, *Primary Examiner.*

ANDREW H. FARRELL, *Examiner.*